Figure 1:
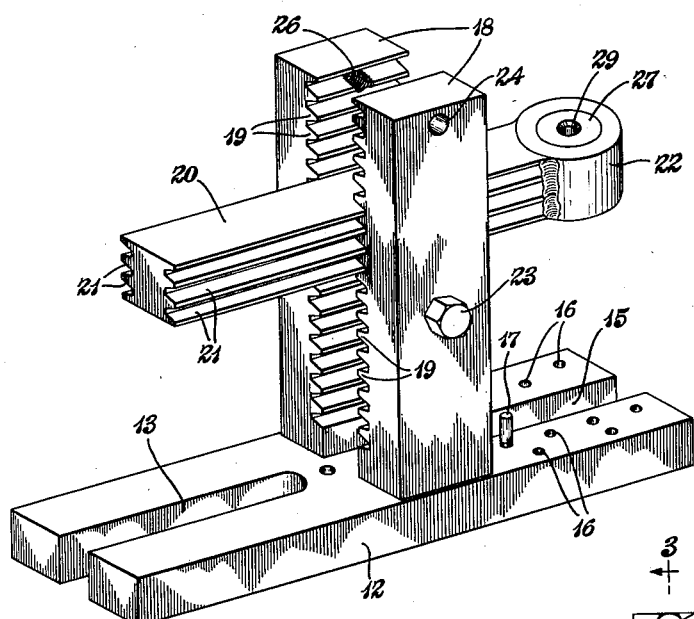

April 14, 1953 W. H. JOHNSON 2,634,632
UNIVERSAL JIG FOR DRILLING AND THE LIKE
Filed Nov. 7, 1949

INVENTOR.
Warren Harold Johnson
BY
Frease and Bishop
ATTORNEYS

Patented Apr. 14, 1953

2,634,632

UNITED STATES PATENT OFFICE 2,634,632

UNIVERSAL JIG FOR DRILLING AND THE LIKE

Warren Harold Johnson, Orrville, Ohio, assignor to The Will-Burt Company, Orrville, Ohio, a corporation of Ohio Application November 7, 1949, Serial No. 125,951

3 Claims. (Cl. 77—62)

The invention relates to jigs for use in connection with drilling, tapping and other rotary spindle machines, and more particularly to a universal jig which will accommodate a wide range of work.

It is customary machine shop practice, where a number of similar pieces are to be formed with a similar arrangement of holes drilled, tapped or otherwise machined therein by a plurality of rotary spindles, to build a jig for properly and accurately locating and guiding the plurality of drills or other rotary spindles for each particular job.

The manufacturing cost of such permanent jigs is relatively high, and is not economic, especially in cases where only a limited number of similar pieces are to be made.

The present invention contemplates the provision of a universal jig which may be quickly and easily adjusted to accurately position and guide any desired arrangement of drills, or other rotary spindles, relative to the work piece.

Accordingly a principal object of the invention is to provide a universal jig capable of being readily adjusted to accommodate work pieces of varying sizes and shapes and to locate and guide a plurality of rotary spindles of various diameters to machine any desired arrangement of holes in the work pieces.

Another object is to provide a universal jig comprising a bed plate and a plurality of similar spindle positioning and guiding fixtures adjustably mounted upon the bed plate in any desired arrangement.

A further object is to provide a spindle positioning and guiding fixture comprising a base, an upright upon the base, and a vertically and horizontally adjustable spindle guide upon the upright.

A still further object is to provide such a fixture in which the upright is in the form of a spaced pair of opposed rack bars and the spindle guide is provided with a horizontally disposed double rack bar, vertically and horizontally adjustable upon the upright.

Another object of the invention is to provide a fixture of the character referred to in which the rotary spindle guide is provided with a removable bushing, whereby spindles of various diameters may be accurately positioned and guided therethrough.

Figure 3:
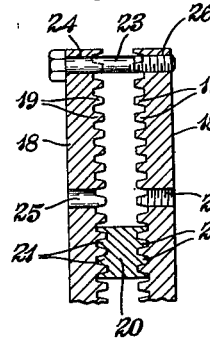
Figure 2:
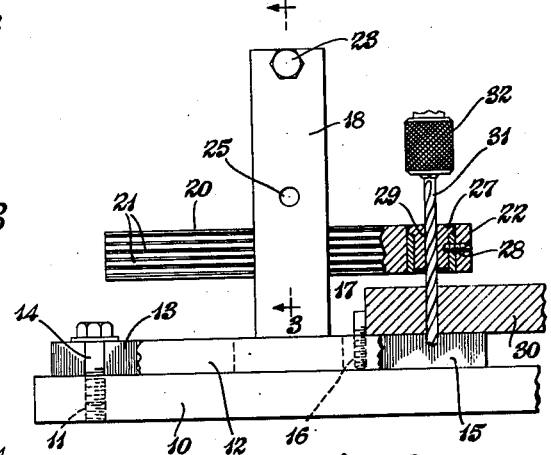

The above and other objects, apparent from the drawing and following description, may be attained, the above described difficulties overcome and the advantages and results obtained, by the apparatus, construction, arrangement and combinations, sub-combinations and parts which comprise the present invention, a preferred embodiment of which, illustrative of the best mode in which applicant has contemplated applying the principle, being set forth in detail in the following description and illustrated in the accompanying drawing, in which:

Figure 1 is a detached, perspective view of a spindle positioning and guiding fixture forming a part of the universal jig to which the invention pertains;

Fig. 2 a side elevation of one of the fixtures, showing a portion of the bed plate upon which it is mounted, parts being broken in section for the purpose of illustration;

Fig. 3 a section on the line 3—3, Fig. 2; and

Figure 4:
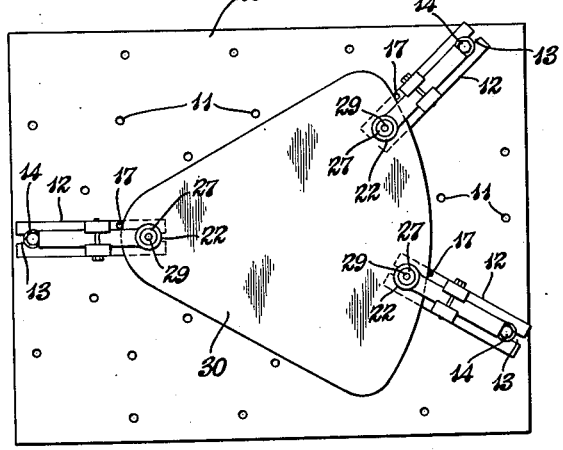

Fig. 4 a top plan view of the complete jig, on a considerably smaller scale.

The jig includes a bed plate 10 which may be formed of steel, or other suitable metal, and may be rectangular in shape, as shown in Fig. 4, or of any other desired shape. A multiplicity of apertures 11 may be formed in the bed plate for the purpose of attaching a plurality of rotary spindle positioning and guiding fixtures, in any desired position, as will be later described in detail.

This bed plate may be mounted upon a bench, table or other horizontal support adjacent to a multiple rotary spindle machine or other conventional rotary spindle machine, such as a drill press or the like. Since the rotary spindle machine itself forms no part of the invention, it is not thought necessary to illustrate the same in the drawing.

Each of the individual rotary spindle positioning and guiding fixtures may be made identically the same, and one of these fixtures is illustrated in detail in Figs. 1 to 3. The fixture is made of steel, or other suitable metal, and comprises an elongated base 12 having a slot 13 at its rear end to receive one or more clamping screws 14, by means of which the base may be rigidly connected to the bed plate 10 in adjusted position, by engaging the screws 14 with the desired apertures 11 in the bed plate.

The forward end of the base 12 is provided with a similar slot 15, to provide a clearance for the end of the drill, or other rotary spindle, after it has passed through the work piece. A plurality of tapped openings 16 may be formed in this end of the base to selectively receive a threaded stud 17 which serves as a stop to properly position the work piece.

An upright is formed upon, or rigidly attached to, an intermediate portion of the base 12, this upright, as shown in the drawing, comprising two spaced, parallel rack bars 18 having the opposed horizontal rack teeth 19 formed upon their inner surfaces.

The spindle guide comprises a horizontal bar 20 having horizontal rack teeth 21 upon its opposite sides for selective sliding engagement with the rack teeth 19 of the upright, whereby the guide head 22 thereof may be vertically and horizontally adjusted relative to the upright.

For the purpose of clamping the bar 20 in adjusted position between the upright rack bars 18, a clamping screw 23 is provided for selective engagement in the upper or lower apertures 24 or 25 in one of the upright rack bars 18 and in the corresponding tapped apertures 26 in the other upright rack bar.

A spindle guide bushing 27 is removably mounted in the guide head 22, of the bar 20, and may be held therein as by the set screw 28. These guide bushings are easily removable and replaceable, whereby a bushing with any desired size of central opening 29 may be easily and quickly inserted into the head 22 to accommodate any desired diameter of drill or other rotary spindle.

In assembling the fixtures upon the bed plate, for any particular job, a plurality of fixtures, corresponding in number to the number of holes to be drilled, tapped or the like, are rigidly connected to the top surface of the bed plate in the desired adjusted position to properly locate the holes to be drilled or tapped in the work piece and the stop pins 17 are positioned upon the base 12 so as to engage the work piece, as indicated at 30 in Fig. 4, and properly position it relative to the fixtures.

The required size of guide bushing 27 is placed in the head 22 of each fixture to accommodate the drill or other rotary spindle to be used therewith. A drill or other rotary spindle, as indicated at 31 in Fig. 2, carried by a chuck 32, is then guided down through the guide opening 29 of each guide bushing 27 and into the work piece 30, as indicated in Fig. 2.

This universal jig may be used in connection with any conventional multiple rotary spindle machine for drilling, tapping or otherwise machining all of the apertures in a work piece in a single operation, or any conventional single rotary spindle machine may be used for separately machining each aperture as desired.

From the above it will be evident that a simple, inexpensive and practical universal jig is provided, comprising a bed plate and a plurality of similar fixtures which may be easily and readily mounted upon the bed plate in adjusted position to accurately position and guide any desired arrangement of rotary spindles relative to the work piece.

While the present invention has been explained and described with reference to and in contemplation of a specific embodiment, it is to be understood nevertheless that numerous variations may be made from the specific showing without departing from the spirit of the present invention.

Accordingly, it is intended not to be limited by the specific language of the aforegoing description, nor by the structural details shown in the accompanying drawing. Within the scope of the appended claims the invention may be practiced otherwise than as specifically illustrated and described, the invention residing in a universal jig comprising a plurality of adjustably mounted fixtures, each having a vertically and horizontally adjustable rotary spindle guide.

I claim:

1. A positioning and guiding fixture for a rotary spindle comprising an elongated, horizontal base having a longitudinal open end slot in each end portion, clamping means associated with one slot, the other slot providing a clearance for the end of the rotary spindle, an upright fixed upon an intermediate portion of the base, said upright comprising a spaced pair of parallel, vertical rack bars having horizontal rack teeth on their opposed surfaces said rack bars having their lower ends fixed to the base and their upper ends free, a horizontal bar longitudinally slidably mounted between said rack bars and having horizontal rack teeth on opposite sides for selective engagement with the teeth upon the rack bars, a clamping screw located through the vertical rack bars at a point spaced from the horizontal bar for clamping the horizontal bar in adjusted position between the rack bars, and a rotary spindle guiding head upon the horizontal bar.

2. A universal jig comprising a bed plate and a plurality of similar positioning and guiding fixtures for rotary spindles, each fixture comprising an elongated, horizontal base having a longitudinal slot in each end portion, a clamping screw located through one slot for adjustably mounting the fixture upon the bed plate, the other slot providing a clearance for the end of the rotary spindle, an adjustably mounted stop pin upon the base, an upright fixed upon an intermediate portion of the base and comprising a spaced pair of parallel, vertical rack bars having horizontal rack teeth on their opposed surfaces said rack bars having their lower ends fixed to the base and their upper ends free, a horizontal bar longitudinally slidably mounted between said rack bars and having horizontal rack teeth on opposite sides for selective engagement with the teeth upon the rack bars, a clamping screw located through the vertical rack bars at a point spaced from the horizontal bar for clamping the horizontal bar in adjusted position between the rack bars, and a rotary spindle guiding head upon the horizontal bar.

3. A positioning and guiding fixture for a rotary spindle comprising an elongated, horizontal base having a slot in each end portion, clamping means associated with one slot, the other slot providing a clearance for the end of the rotary spindle, a spaced pair of parallel uprights fixed upon an intermediate portion of the base, a horizontal bar located between said uprights and horizontally and vertically adjustable therebetween, a clamping screw located through the uprights at a point spaced from the horizontal bar for clamping the horizontal bar in adjusted position between the uprights, and a rotary spindle guiding head upon the horizontal bar.

WARREN HAROLD JOHNSON.

References Cited in the file of this patent

UNITED STATES PATENTS

| Number | Name | Date |
|---|---|---|
| 1,235,031 | Holmgren | July 31, 1917 |
| 1,625,032 | Kettler | Apr. 19, 1927 |
| 2,484,758 | Sonnie | Oct. 11, 1949 |